(12) United States Patent
Mishra et al.

(10) Patent No.: US 8,971,338 B2
(45) Date of Patent: Mar. 3, 2015

(54) EXPANDING NETWORK FUNCTIONALITIES FOR OPENFLOW BASED SPLIT-ARCHITECTURE NETWORKS

(75) Inventors: Ramesh Mishra, San Jose, CA (US); Ludovic Beliveau, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 545 days.

(21) Appl. No.: 13/346,073

(22) Filed: Jan. 9, 2012

(65) Prior Publication Data
US 2013/0176850 A1 Jul. 11, 2013

(51) Int. Cl.
H04L 12/28 (2006.01)
H04L 12/56 (2006.01)
H04J 3/16 (2006.01)
H04J 3/22 (2006.01)
G06F 15/16 (2006.01)
H04L 12/46 (2006.01)
H04L 12/66 (2006.01)

(52) U.S. Cl.
CPC ............... *H04L 12/46* (2013.01); *H04L 12/66* (2013.01)
USPC ........... 370/401; 370/402; 370/466; 370/467; 709/201

(58) Field of Classification Search
CPC ..... H04L 12/24; H04L 12/46; H04L 12/4633; H04L 12/4645; H04L 12/5689; H04L 12/66; H04L 45/50; H04L 45/52; H04L 45/54
USPC ................ 370/401, 402, 465, 466, 467, 469; 709/201
See application file for complete search history.

(56) References Cited

U.S. PATENT DOCUMENTS

| | | |
|---|---|---|
| 2011/0261825 A1 | 10/2011 | Ichino |
| 2011/0286324 A1* | 11/2011 | Bellagamba et al. ......... 370/219 |
| 2013/0010600 A1* | 1/2013 | Jocha et al. ................ 370/236.2 |
| 2013/0010605 A1* | 1/2013 | Jocha et al. ................ 370/241.1 |

OTHER PUBLICATIONS

Kempf et al., OpenFlow MPLS and the Open Source Label Switched Router, Sep. 9, 2011, Teletraffic Congress (ITC), 2011 23rd International, pp. 1-7.*
Pfaff et al., OpenFlow Switch Specication Version 1.1.0, Feb. 28, 2011, pp. 1-56.*
Bryant, S. , et al., "Pseudo Wire Emulation Edge-to-Edge (PWE3) Architecture", *Network Workin Group*; Internet Memo, 42 pages.

* cited by examiner

*Primary Examiner* — Un C Cho
*Assistant Examiner* — Jeremy Costin
(74) *Attorney, Agent, or Firm* — Blakely, Sokoloff, Taylor & Zafman, LLP (57) ABSTRACT

A method enables a switch in a split-architecture network to provide high speed packet processing and enhanced network functionalities that are not supported by the OpenFlow. The switch receives a packet from a network through an input port of the switch, and matches header fields in the packet against table entries in flow tables to identify an action to be taken. The flow tables are part of an OpenFlow pipeline. The identified action is to direct the packet to a designated processing unit in the switch. The OpenFlow pipeline forwards the packet to the designated processing unit via a communication channel in the switch. The designated processing unit processes the packet with the enhanced network functionalities, and injects the packet back to one of the flow tables before transmission of the packet to the network through an egress port of the switch.

18 Claims, 7 Drawing Sheets

PU OPERATION FOR GENERATING MPLS-TP G-ACH MESSAGE

EXPANDING NETWORK FUNCTIONALITIES FOR OPENFLOW BASED SPLIT-ARCHITECTURE NETWORKS

FIELD OF THE INVENTION

Embodiments of the invention are related to OpenFlow based split-architecture networks. Specifically, embodiments of the invention relate to the use of processing units in an OpenFlow based switch to performed functions that are not supported by the current OpenFlow specification, such as the OpenFlow 1.1 specification.

BACKGROUND

Unlike the traditional network architecture, which integrates both the data plane and the control plane in the same box (e.g., a network element such as a router), a split-architecture network decouples these two planes and executes the control plane on servers (controllers) that might be in different physical locations from the forwarding elements (switches). The use of a split architecture in a network enables the simplification of the switches and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

In a split-architecture network, controllers collect information from switches, and compute and distribute the appropriate forwarding decisions to switches. Controllers and switches use a protocol to communicate and exchange information. An example of such protocol is OpenFlow (see the OpenFlow 1.1 Specification), which provides an open and standard method for a switch to communicate with a controller, and it has drawn significant interest from both academics and industry.

SUMMARY

A method implemented by a network element functioning as a switch in a split-architecture network enables the switch to provide high speed packet processing and enhanced network functionalities that are not supported by the OpenFlow. The switch receives a packet from a network through an input port of the switch, and matches header fields in the packet against table entries in flow tables to identify an action to be taken. The flow tables are part of an OpenFlow pipeline. The identified action is to direct the packet to a designated processing unit in the switch. The OpenFlow pipeline forwards the packet to the designated processing unit via a communication channel in the switch. The designated processing unit processes the packet with the enhanced network functionalities, and injects the packet back to one of the flow tables before transmission of the packet to the network through an egress port of the switch.

A network element functioning as a switch in a split-architecture network that includes a controller coupled to a set of switches. The switch provides high speed packet processing and enhanced network functionalities that are not supported by the OpenFlow. The network element includes a communication channel, a first set of processing cores, an ingress port, a second set of processing cores and an egress port. The communication channel is coupled to an OpenFlow pipeline that includes a set of flow tables and each of the flow tables including a set of table entries. The first set of processing cores are coupled to the OpenFlow pipeline via the communication channel to perform operations of a set of the processing units. Each of the processing units is operable to process packets with the enhanced network functionalities and to inject the packets back to one of the flow tables in the OpenFlow pipeline. The ingress port is coupled to the OpenFlow pipeline to receive a packet from a network. The second set of processing cores are coupled to the communication channel, the first set of processing cores and the ingress port, to perform operations of the OpenFlow pipeline. The OpenFlow pipeline is to match one or more header fields in the packet against the table entries to identify an action in a matching table entry as directing the packet to a designated processing unit, and to forward the packet to the designated processing unit for processing. The egress port is coupled to the OpenFlow pipeline to transmit the packet to the network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

Embodiments of the invention provide enhanced switch functions that are highly efficient. The functions are "enhanced" because they are not supported by current OpenFlow specification (e.g., OpenFlow 1.1 specification). The functions are switch functions because they are performed by an enhanced switch on the data path. An enhanced switch, as described herein, refers to an OpenFlow switch that includes an OpenFlow pipeline and is enhanced to include one or more processing units. An enhanced switch can process not only the OpenFlow data path traffic, but also network functionalities not supported by current OpenFlow specification, such as psuedowires, operations, administration and maintenance (OAM) functions implemented on a Multi-Label Protocol Switching-Transport (MLPS-TP) network or a different network, Virtual Private Local Area Network Service (VPLS), and the like.

A conventional OpenFlow switches do not support any OAM mechanism. Rather, the controller is responsible for the OAM, including sending and receiving packets for failure detection and recovery. This can lead to high delays in link failure discovery and hence the network convergence time may become unacceptable for many carriers. Embodiments of the invention push some high frequency (e.g., time sensitive) processing on the datapath to maintain telecommunication company (telco) grade requirements. Embodiments of the invention provide a processing mechanism including one or more processing units that work together with the OpenFlow pipeline to achieve high throughput and low latency packet processing.

The processing units describes herein are packet processing functional blocks that alter packets as needed and re-submit them to the OpenFlow pipeline. These processing units can be mapped to a multi-core processor chip, such as a 64-core Tilera® processor chip or other multi-core processing chip, thus creating a multi-core-enabled OpenFlow-based enhanced switch to support a wide range of network functions.

Figure 1:
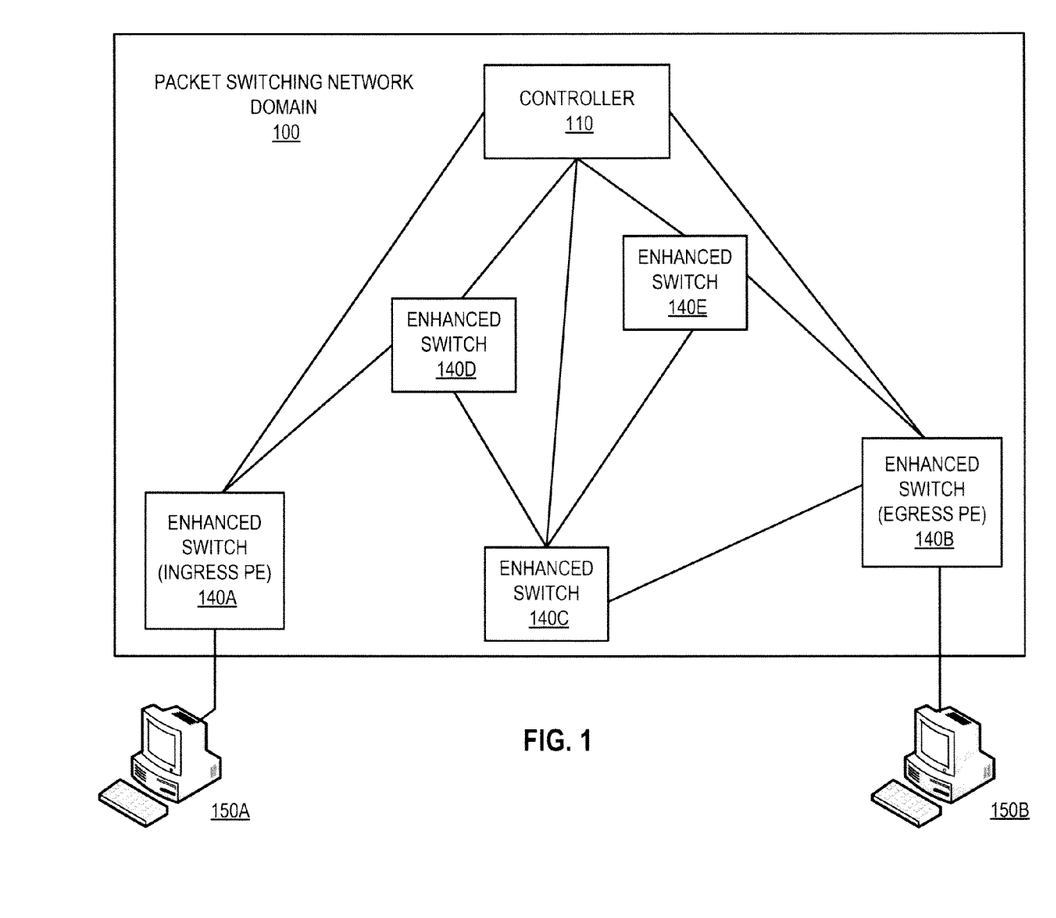
FIG. 1 is a diagram of one embodiment of an example architecture for an OpenFlow based split-architecture network.

FIG. 1 is a block diagram showing a packet switching network domain 100 according to one embodiment of the invention. The packet switching network domain 100 includes a controller 110 coupled to a number of enhanced switches 140A-E. As described herein, the packet switching network domain 100 is a portion of a packet switching network that is under the control of a single controller. The packet switching network domain 100 has a split architecture in which the control plane (represented by the controller 110) is decoupled from the data forwarding plane (represented by the enhanced switches 140A-E). Each of the enhanced switches 140A-E performs packet forwarding and network functions, making use of a OpenFlow pipeline that includes a set of flow tables for packet processing. The OpenFlow pipeline can be implemented in accordance to the OpenFlow 1.1 specification.

Each of the enhanced switches 140A-E can communicate with the controller 110 via a direct link or one or more other enhanced switches 140A-E. One of the enhanced switches (e.g., 140A) serves as an ingress switch through which a packet enters the packet switching network domain 100, and another one of the enhanced switches (e.g., 140B) serves as an egress switch through which the packet exits the packet switching network domain 100.

In addition to the functionalities specified by the OpenFlow 1.1 specification, each of the enhanced switches 140A-E also supports network functions that the OpenFlow 1.1 specification does not support.

Figure 2:
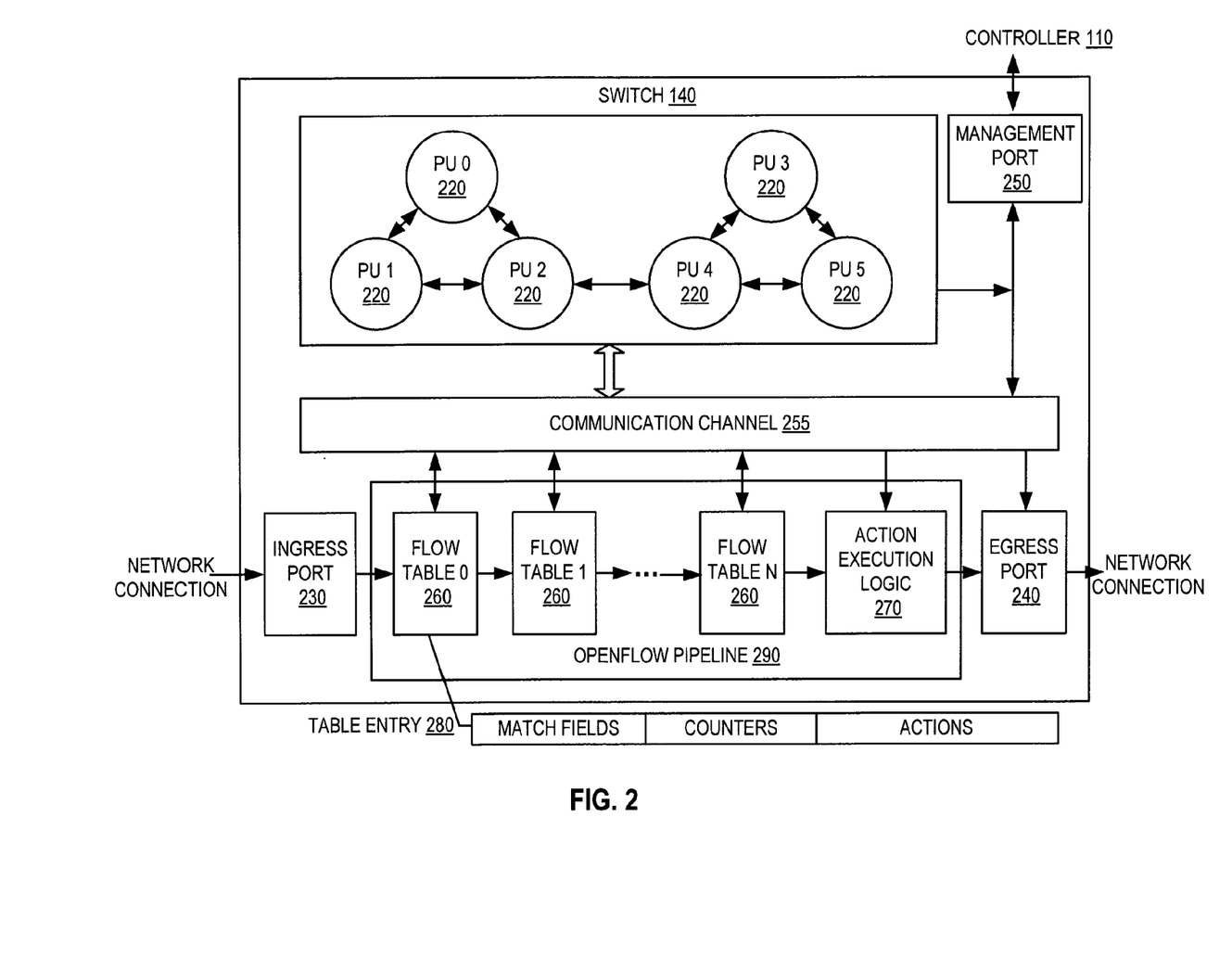
FIG. 2 is a diagram of one embodiment of an enhanced switch that includes a number of processing units.

The embodiments of the invention are implemented in a network element such as one or more of the enhanced switches 140A-E. An example of the enhanced switches 140A-E is shown in FIG. 2 as an enhanced switch 140. The enhanced switch 140 can be any one of the enhanced switches 140A-E of FIG. 1.

In one embodiment, the enhanced switch 140 receives packets from an ingress port 230 and transmits them to a set of network connections through an egress port 240. A 'set,' as used herein refers to any positive whole number of items including one item. These two ports 230, 240 function together to enable communication with any number of other devices over a network using any number or combination of links.

The enhanced switch 140 includes an OpenFlow pipeline 290 between the ingress port 230 and the egress port 240. The OpenFlow pipeline 290 is formed by a sequence of flow tables 260. The flow tables 260 can be programmed by a controller (e.g., the controller 110) associated with the enhanced switch 140 according to the protocols defined by the OpenFlow. When an incoming packet arrives in the enhanced switch 140, the header information and/or incoming port of the packet is compared with the entries of the flow tables. As a result of matching the packet in the first flow table, the packet can be updated, sent out through a port or sent to a subsequent table for further processing. Metadata can be assigned to the packet during processing in each flow table and passed to the subsequent tables. The packet can be processed by each table in the OpenFlow pipeline 290, or can be forwarded to a port or any particular table in the OpenFlow pipeline 290, thereby bypassing the processing of intermediate tables.

Each flow tables 260 includes a set of entries (e.g., table entry 280), where each entry describes a packet handling alternative with three fields: match fields, counters and actions. Match fields are rules that specify the circumstances under which the actions are to be executed. For example, a rule can specify that if a packet header field (e.g., the Ethernet header fields, MPLS header fields, IP header fields, etc.) matches a given value, a corresponding action should be taken. The actions can be executed by an action execution logic 270. In each instance where the actions are applied, the corresponding counter is updated.

The enhanced switch 140 also includes a management port 250 to communicate with its associated controller 110. OpenFlow control messages from the controller 110 and OpenFlow messages to the controller 110 can be transmitted through the management port 250.

According to one embodiment of the invention, the enhanced switch 140 includes a set of processing units 220 (shown in FIG. 2 as "PUs") coupled to the OpenFlow pipeline 290 via a communication channel 255. The communication channel 255 can include a set of links, and each processing unit 220 is coupled to at least one link. The processing units 220 perform packet processing on the datapath. Each processing unit 220 has at least the following properties:

It is identified by an identifier which can be used by any one of the flow tables 260 to forward packets to it.
It can be chained to another processing unit 220.
It can have a parent processing unit 220 and/or a child processing unit 220 to form a hierarchy.
It can inject packets back to any of the flow tables 260.
It can send packets out of the physical ports, such as the egress port 240 and the management port 250.

Depending on the application requirements, the processing units 220 can be configured to perform chaining, pipelining, nesting, de-nesting, and other complex operations. Adding the processing units 220 to the enhanced switch 140 not only provides time sensitive processing on the datapath, but also allows for the addition of vendor-specific extensions for future protocols.

In the embodiment of FIG. 2, those components relevant to understanding the switch processing are illustrated and discussed while other components are omitted for sake of clarity. The processing units 220 can be any number of modules dedicated to processing the forwarding and handling of data packets. Each processing unit 220 can be programmed to perform any specified network functions.

Figure 3A:
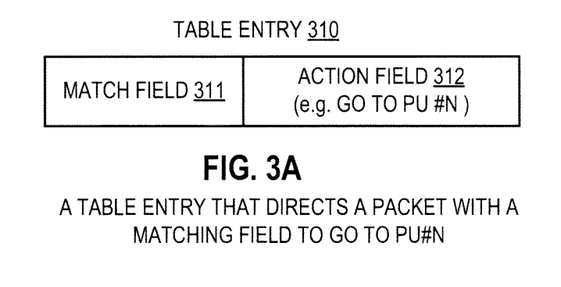
FIGS. 3A and 3B are diagrams illustrating the identification of a processing unit in an enhanced switch according to embodiments of the invention.
Figure 3B:
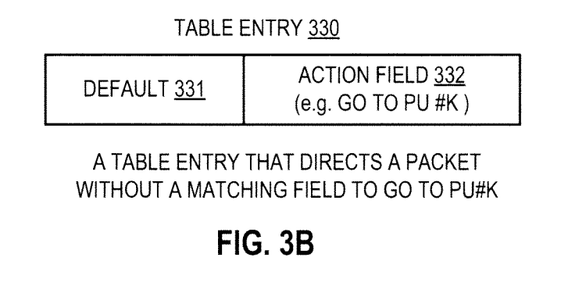

FIGS. 3A and 3B illustrates two embodiments of entries 310,330 of the flow tables 220 in the enhanced switch 140. Referring to FIG. 3A, the table entry 310 includes a match field 311 which can indicate a given value of a packet header field, such as an Ethernet header field, an MPLS header field, an Internet Protocol (IP) header field, and the like. The table entry 310 also includes an action field 312, which indicates that if a packet with a matching field (e.g., the value of the packet's header field matches the stored header field value in the match field 311) arrives, the packet is directed to a particular processing unit 220 (e.g., the processing unit 220 having an identifier N). Referring to FIG. 3B, the table entry 330 includes a default value 331 and an action field 332, which indicates if a packet's header field value does not match any of the table entries, the packet will be directed to processing unit having an identifier K. The default value 331 can be any predetermined value. The table entries 310,330 identify those packets that need further processing by the processing units 220.

The processing units 220 can perform a wide range of functions and can be configured into various interconnection topologies according to the application requirements. In the following, two specific functions, pseudowire and MPLS-TP OAM are described.

Pseudowire Functions

Before describing the use of processing units 220 to perform pseudowire functions, it may be helpful to explain some basic concepts of pseudowire. Pseudowire is an emulation of end-to-end connection over a packet switching network. From the perspective of Customer Edge Equipment (CE), the pseudowire is characterized as an unshared link or circuit of a chosen service.

In particular, Pseudowire Emulation Edge to Edge (PWE3) is defined as a mechanism that emulates service provider edge-to-edge connections, including the essential attributes of telecommunications services (such as a T1 leased line or Frame Relay) over a packet switching network. PWE3 defines an Encapsulation Layer, a method of carrying various payload types, and an interface to the pseudowire demultiplexer layer. The other layers can be provided by tunneling methods such as Layer 2 Tunneling Protocol (L2TP) or MPLS over a packet switched network. For simplicity of discussions, pseudowire in connection with an MPLS packet switched network is discussed in the following description.

PWE3 defines a control word, which is used to distinguish a pseudowire payload from an IP payload carried over an MPLS packet switched network. The use of control words is optional. A control word can be used to maintain packet ordering. A control word can also be used to tag an OAM packet as an additional packet header called pseudowire Associated Channel (ACH). The pseudowire ACH indicates that the OAM packet is to be processed by the appropriate OAM function, rather than being forwarded to the attachment circuit.

Figure 4:
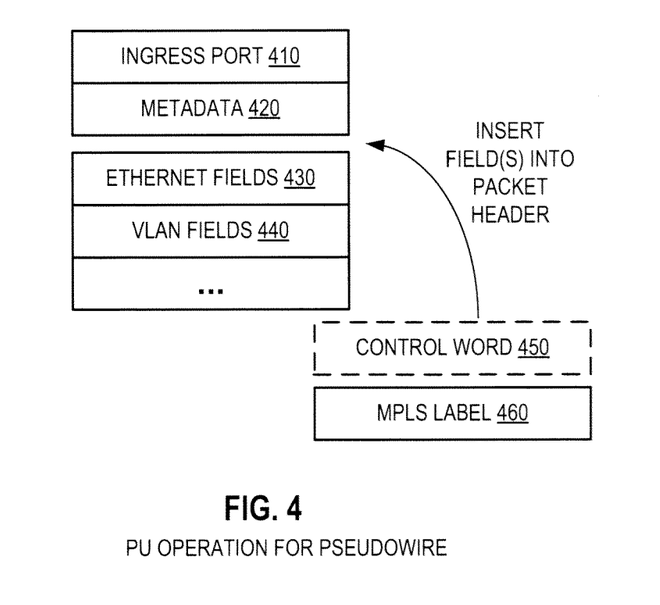
FIG. 4 is a diagram of one example functionality performed by a processing unit of an enhanced switch according to embodiments of the invention.

FIG. 4 illustrates an embodiment of a pseudowire operation performed by a processing unit. A specific processing unit (e.g., one of the processing units 220 of FIG. 2) is designated as a pseudowire processing component, which is responsible for processing control words (if any) and pseudowire labels. The resulting packet can be sent back to the originating flow table or another flow table for further processing. This processing unit implements different roles depending on whether it is residing in an ingress processing element (PE) (e.g., the enhanced switch 140A of FIG. 1) or an egress PE (e.g., the enhanced switch 140B of FIG. 1).

The enhanced switch that serves as an ingress PE is able to stack at least two labels (e.g., a MPLS label 460 and a tunnel label) and a control word 450 into a packet header. In some scenarios, the control word 450 may not be necessary and therefore may be absent from the packet header. In one embodiment, an ingress PE can perform the following sequence of operations: (1) An Ethernet packet arrives at Table 0 (e.g., one of the flow tables 220 of FIG. 2). (2) OpenFlow match is performed on the incoming port and layer 2 headers. (3) The packet is sent to a processing unit with a given identifier (e.g., identifier 'X') designated for ingress pseudowire processing. (4) The processing unit reforms the layer 2 packet by adding an MPLS label before the Ethernet header that the packet came with. The processing unit may also add a control word to the packet. It also prepends the same Ethernet header that the packet came with before the MPLS label such that the packet can be recognized by the flow tables in the OpenFlow pipeline. (5) The processing unit sends the packet back to Table 0, identifying the packet as coming from processing unit identifier 'X'. (6) Table 0 matches the MPLS label of the packet against the incoming port 'X' and pushes another label (e.g., a tunnel label). (7) The packet is sent to a next flow table or directly proceed to the egress port to be sent on the pseudowire.

The enhanced switch that serves as an egress PE is able to be pop the two labels (e.g., the tunnel label and the MPLS label 460) that were pushed by the ingress PE. When receiving a packet with a control word, the egress PE is also able to process the control word 450 (e.g., sequence number processing) for the packet. The egress PE then forwards the layer 2 packet on the correct port. In one embodiment, the egress PE performs the following sequence of operations: (1) An Ethernet packet arrives at Table 0. (2) OpenFlow match is performed on the incoming port and the MPLS label of the packet. (3) The outer label (e.g., the tunnel label) is popped and written to metadata associated with the packet. (4) The packet is sent to Table 1. (5) OpenFlow match is performed on the next label and metadata. (6) The packet is sent to a processing unit with a given identifier (e.g., identifier 'Y') designated for egress pseudowire processing. (7) The processing unit 'Y' pops the MPLS label and performs control word processing. For example, the processing unit can implement a sequence number algorithm to determine whether the incoming packets arrive in a correct order. (8) The processing unit sends back the original Ethernet packet to the OpenFlow pipeline, identifying the packet as coming from processing unit identifier 'Y'. (9) The packet is sent on the pseudowire using the current OpenFlow protocol.

MPLS-TP OAM Functions

OAM is an important and fundamental functionality in transport networks. A transport OAM suite supports rapid detection of faults that cause Service Level Agreement (SLA) violation and is be able to localize such faults upon detection. It provides rapid indication of remote faults so that path protection can be triggered. It also provides a non-intrusive way to detect the degradation of service, such as an increase in packet loss, which in turn would cause SLA violation. An OAM suite has both continuous (proactive) and on-demand (reactive) functions. The OAM functions implemented in MPLS-TP include: continuity check, fault localization, remote integrity, alarm suppression and performance monitoring.

Figure 5:
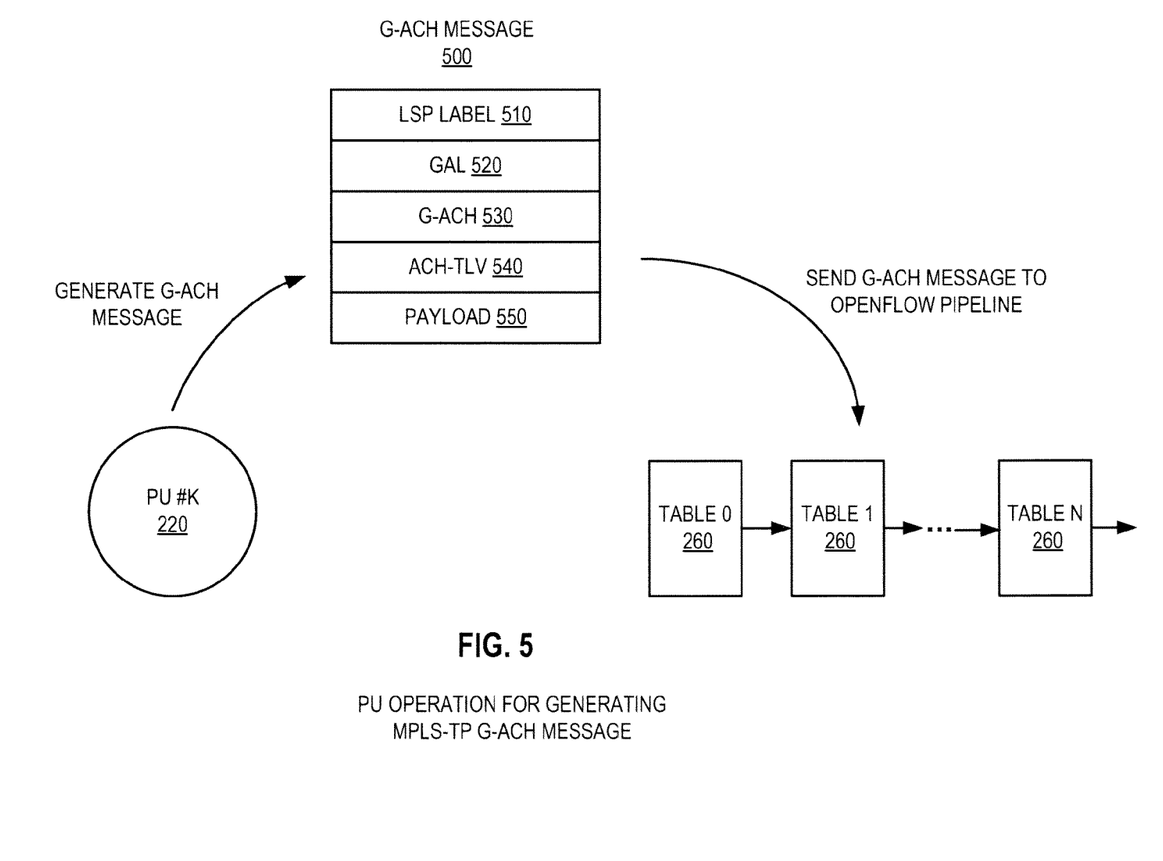
FIG. 5 is a diagram of one example functionality performed by a processing unit of an enhanced switch according to embodiments of the invention.

As discussed above in connection with pseudowire processing, OAM packets can be tagged with an additional packet header called pseudowire Associated Channel (ACH), which indicates that they are to be processed by the appropriate OAM function, rather than being forwarded to the attachment circuit. The concept of ACH can be generalized to a generic ACH (G-ACH) and applies not only to psuedowires, but also to the MPLS-TP label switch paths (LSPs) and segments defined in the MPLS-TP. The G-ACH is a packet header that provides the demultiplexer function for OAM packets, identifying them and thus enabling appropriate handling of packets. To further enhance the flexibility and extensibility of this mechanism, a set of time-length-values (TLVs) can also be also defined to encode context information necessary for processing of OAM packets. The packet header for OAM packets in MPLS-TP are shown in FIG. 5 as a G-ACH message 500 that includes a LSP label 510, a generic associated label (GAL) 520, a G-ACH header 530, ACH-TLV 540, and a payload 550. Some of the fields may be optional; for example, the ACH-TLV 540 may be omitted from G-ACH message 500. Some of the fields may use a predetermined value to indicate the presence of a G-ACH header; e.g., value 13 of the GAL 520 can be an indication of a G-ACH header.

FIG. 5 illustrates an embodiment of a mechanisms for generating the G-ACH message 500 by a designated processing unit having an identifier K. After the G-ACH message 500 is generated, the processing unit injects the message 500 back to one of the flow tables 260 in the OpenFlow pipeline, which can push additional labels (e.g., the pseudowire and tunnel labels described above) to form a packet and then send the packet out to the network connections. For example, a processing unit can be designated as a Bidirectional Forwarding Detection (BFD) packet generator, which generates a BFD packet every second. The processing unit can fill in the timing fields of the BFD packet, the necessary G-ACH TLVs, and the GAL MPLS label.

In some embodiments, an enhanced switch can include one or more processing units to process the OAM packets that have the G-ACH header. For example, when an OAM packet arrives at an enhanced switch that serves Management End Points (MEP), the LSP label 510 is popped and the GAL 520 (e.g., with the label value 13) is exposed. As the label value 13 of the GAL 520 indicates the presence of G-ACH header, the packet is to be forwarded to a processing unit designated for processing G-ACH messages. The MEP ensures that the OAM packet does not get forwarded beyond the MEP, but instead are processed by appropriated OAM functions.

Figure 6:
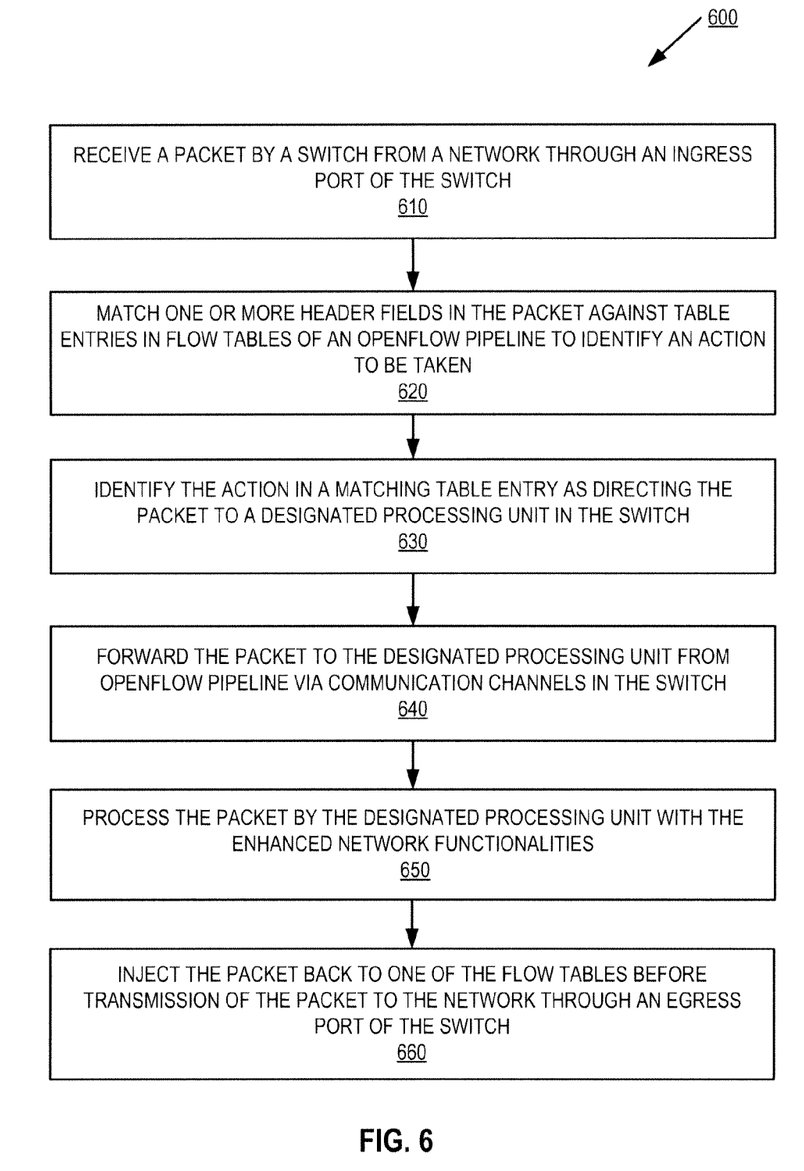
FIG. 6 is a flowchart of one embodiment of a method for performing enhanced switch functions.

FIG. 6 is a flowchart of one embodiment of a method of performed by an enhanced switch (e.g., the enhanced switch 140 of FIGS. 1 and 2). The enhanced switch receives a packet from a network through an ingress port of the switch (block 610). The OpenFlow pipeline in the enhanced switch matches one or more header fields in the packet against table entries in its flow tables to identify an action to be taken (block 620). The identified action specifies that the packet is to be directed to a designated processing unit in the switch (block 630). The OpenFlow pipeline forwards the packet to the designated processing unit via communication channels in the switch (block 640). The designated processing unit processes the packet with the enhanced network functionalities; that is, the functionalities that are not supported by the current OpenFlow Specification (e.g., the OpenFlow 1.1 Specification) (block 650). After the packet processing, the designated processing unit injects the processed packet back to one of the flow tables before the packet is transmitted to the network through an egress port of the switch (block 660).

Figure 7:
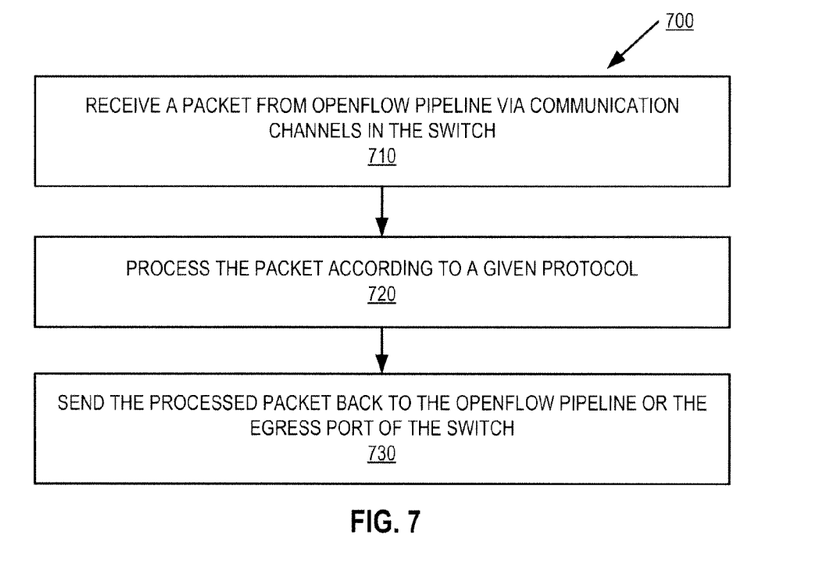
FIG. 7 is a flowchart of one embodiment of a method performed by a processing unit for packet processing.

FIG. 7 is a flowchart of one embodiment of a method of performed by a processing unit for packet processing. A processing unit (e.g., one of the processing units 220 of FIG. 2) receives a packet from the OpenFlow pipeline via communication channels in the switch (block 710). The processing unit processes the packet according to a given protocol (e.g., pseudowire, MPLS-TP OAM functions, etc.) that is not defined by the current OpenFlow Specification (e.g., the OpenFlow 1.1 Specification) (block 720). After the packet processing, the processing unit sends the processed packet back to the OpenFlow pipeline for further processing or the egress port of the switch for transmission (block 730). In some embodiments, the processing unit can send the processed packet to another processing unit for additional processing operations that are not defined by the current Open- Flow Specification (e.g., the OpenFlow 1.1 Specification) before sending the packet back to the OpenFlow pipeline.

Figure 8:
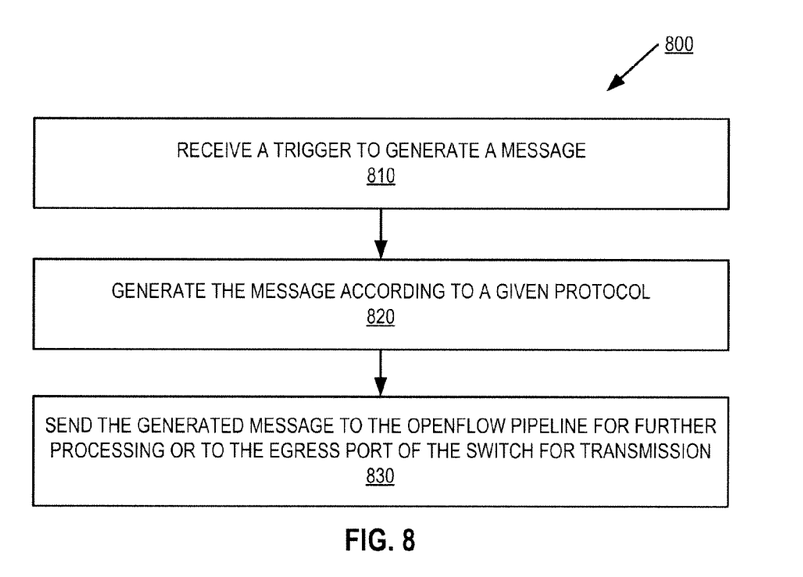
FIG. 8 is a flowchart of one embodiment of a method performed by a processing unit for generating a message.

FIG. 8 is a flowchart of one embodiment of a method of performed by a processing unit for generating an G-ACH message, as described in connection with FIG. 5. When the processing unit receives a trigger to generate a G-ACH message (block 810), it generates the G-ACH message according to a given protocol (block 820) (e.g., the MPLS-TP protocol). After generating the G-ACH message, the processing unit sends the generated G-ACH message to the OpenFlow pipeline for further processing or to the egress port of the switch for transmission (block 830).

Figure 9:
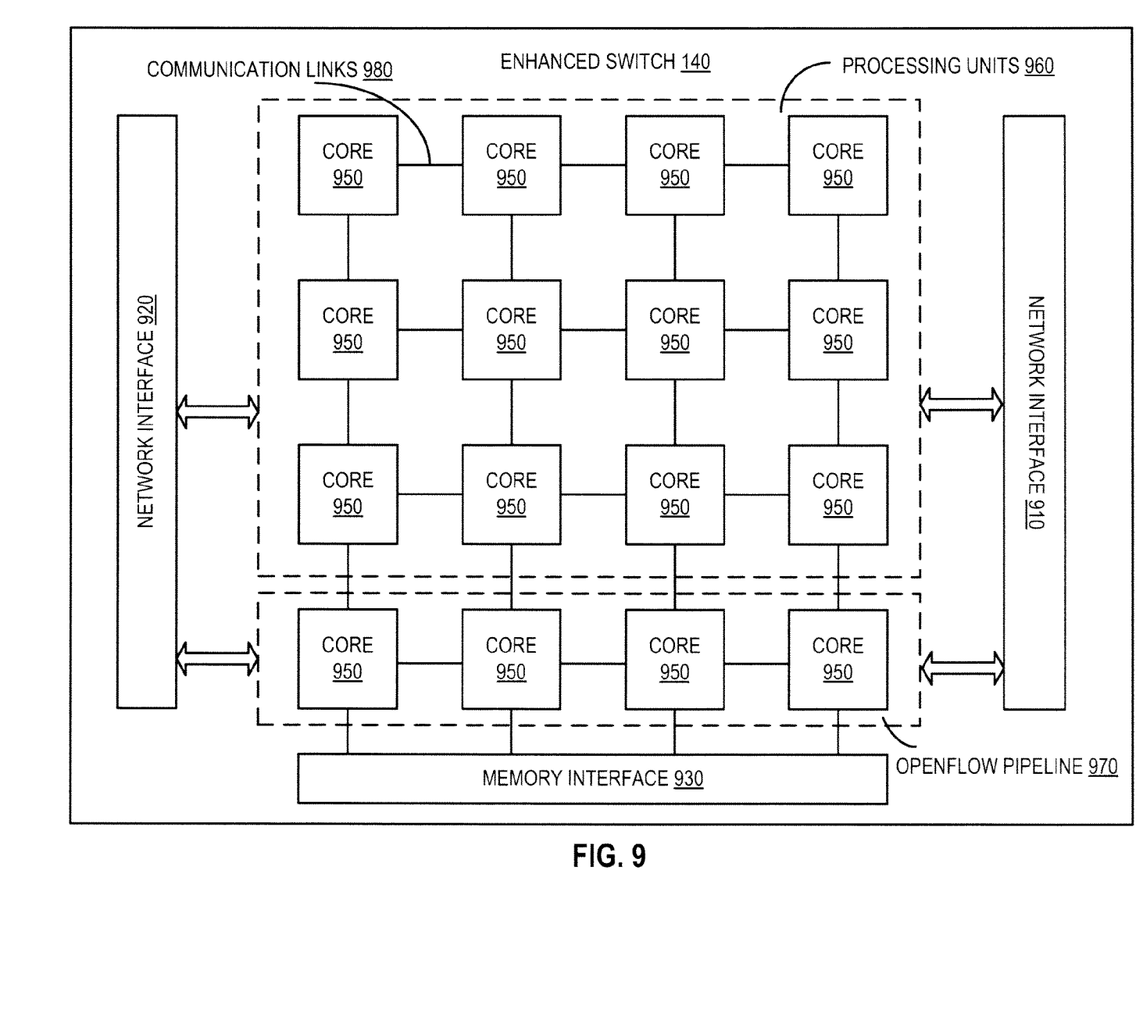
FIG. 9 is a block diagram of an embodiment of a multi-core processor on which an enhanced switch may be implemented.

FIG. 9 is a block diagram of one embodiment of a hardware platform that can be used to implement the enhanced switch 140. The hardware platform includes multiple programmable cores 950 in a two-dimensional array. The cores 950 are interconnected via communication links 980, such as a mesh network. In one embodiment, the hardware platform can be implemented by a Tilera® processing chip that contains 64 cores. The hardware platform also includes a memory interface 930, a network interface 910 (e.g., for receiving incoming packets) and a network interface 920 (e.g., for transmitting outgoing packets).

In one embodiment, some of the cores 950 can be configured as an OpenFlow pipeline 970, performing functions described above in connection with the OpenFlow pipeline 290 of FIG. 2. The other cores 950 can be configured as processing units 960, performing functions described above in connection with the processing units 220 of FIG. 2. Each core 950 can be mapped to one or more processing units, depending on the number of processing units needed. In one embodiment, dedicated cores can be assigned to handle packet ingress, OpenFlow table lookups, action execution, and packet egress. Information between the processing units 960 and the OpenFlow pipeline 970 can be efficiently exchanged through the mess network.

The operations of the flow diagrams of FIGS. 6-8 have been described with reference to the exemplary embodiment of FIGS. 1 and 2. However, it should be understood that the operations of the flow diagrams of FIGS. 6-8 can be performed by embodiments of the invention other than those discussed with reference to FIGS. 1 and 2, and the embodiments discussed with reference to FIGS. 1 and 2 can perform operations different than those discussed with reference to the flow diagrams. While the flow diagram of FIGS. 6-8 show a particular order of operations performed by certain embodiments of the invention, it should be understood that such order is exemplary (e.g., alternative embodiments may perform the operations in a different order, combine certain operations, overlap certain operations, etc.).

As described herein, operations performed by the enhanced switch may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element functioning as a switch in a split-architecture network that includes a controller coupled to a plurality of switches, the method enabling the switch to provide high speed packet processing and enhanced network functionalities, the method comprising the steps of:
   receiving a packet by the switch from a network through an input port of the switch;
   matching one or more header fields in the packet against a set of table entries in a set of flow tables to identify an action to be taken, the set of flow tables being part of an OpenFlow pipeline;
   identifying the action in a matching table entry as directing the packet to a designated one of a set of processing units in the switch, wherein the set of processing units in the switch are external to the OpenFlow pipeline;
   forwarding the packet to the designated processing unit from the OpenFlow pipeline via a communication channel in the switch;
   processing the packet by the designated processing unit with the enhanced network functionalities, wherein the enhanced network functionalities include functionalities that are not supported by the OpenFlow pipeline of the switch; and
   injecting the packet from the designated processing unit back to one of the flow tables in the OpenFlow pipeline before transmission of the packet to the network through an egress port of the switch.

2. The method of claim 1, wherein the step of processing the packet comprises the step of inserting a Multiprotocol Label Switching (MPLS) label before an Ethernet header of the packet in accordance with a Pseudowire protocol.

3. The method of claim 1, wherein the step of processing the packet comprises the step of inserting a control word before an Ethernet header of the packet in accordance with a Pseudowire protocol.

4. The method of claim 1, further comprising the steps of:
   generating by a second designated processing unit a Generic Associated Channel (G-ACH) message in accordance with a MPLS Transport Profile (MPLS-TP) protocol; and
   injecting the G-ACH message into the OpenFlow pipeline for further processing.

5. The method of claim 4, wherein the G-ACH message is an Operations, Administration and Maintenance (OAM) packet.

6. The method of claim 1, wherein each of the processing units has a configurable functionality that is different from each other.

7. The method of claim 1, wherein the processing units are interconnected via configurable communication links to form a hierarchy.

8. The method of claim 1, wherein the processing units are interconnected via configurable communication links to form a chain.

9. The method of claim 1, wherein each of the processing units runs on one or more cores in a multi-core processor.

10. A network element functioning as a switch in a split-architecture network that includes a controller coupled to a set of switches, the switch to provide high speed packet processing and enhanced network functionalities, the network element comprising:
- a communication channel coupled to an OpenFlow pipeline that includes a set of flow tables and each of the flow tables including a set of table entries;
- a first set of processing cores coupled to the OpenFlow pipeline via the communication channel to perform operations of a set of processing units, each of the processing units operable to process packets with the enhanced network functionalities and to inject the packets back to one of the flow tables in the OpenFlow pipeline, wherein the enhanced network functionalities include functionalities that are not supported by OpenFlow pipeline of the switch and wherein the set of processing units are external to the OpenFlow pipeline;
- an ingress port coupled to the OpenFlow pipeline to receive a packet from a network;
- a second set of processing cores coupled to the communication channel, the first set of processing cores and the ingress port, to perform operations of the OpenFlow pipeline, the OpenFlow pipeline to match one or more header fields in the packet against the table entries to identify an action in a matching table entry as directing the packet to a designated one of the processing units, and to forward the packet to the designated processing unit for processing; and
- an egress port coupled to the OpenFlow pipeline to transmit the packet to the network.

11. The network element of claim 10, wherein the designated processing unit comprises one or more processing cores in the first set of processing cores to insert a Multiprotocol Label Switching (MPLS) label before an Ethernet header of the packet in accordance with a Pseudowire protocol.

12. The network element of claim 10, wherein the designated processing unit comprises one or more processing cores in the first set of processing cores to insert a control word before an Ethernet header of the packet in accordance with a Pseudowire protocol.

13. The network element of claim 10, wherein the set of processing units comprises a second designated processing unit, which comprises one or more processing cores to generate a Generic Associated Channel (G-ACH) message in accordance with a MPLS Transport Profile (MPLS-TP) protocol, and to inject the G-ACH message into the OpenFlow pipeline for further processing.

14. The network element of claim 13, wherein the G-ACH message is an Operations, Administration and Maintenance (OAM) packet.

15. The network element of claim 10, wherein each of the set of processing units has a configurable functionality that is different from each other.

16. The network element of claim 10, wherein the set of processing units are interconnected via configurable communication links to form a hierarchy.

17. The network element of claim 10, wherein the set of processing units are interconnected via configurable communication links to form a chain.

18. The network element of claim 10, wherein the set of processing units are interconnected via configurable mesh connections.

* * * * *

UNITED STATES PATENT AND TRADEMARK OFFICE
CERTIFICATE OF CORRECTION

| | | |
|---|---|---|
| PATENT NO. | : 8,971,338 B2 | Page 1 of 1 |
| APPLICATION NO. | : 13/346073 | |
| DATED | : March 3, 2015 | |
| INVENTOR(S) | : Mishra et al. | |

It is certified that error appears in the above-identified patent and that said Letters Patent is hereby corrected as shown below:

In the specification

In Column 3, Line 63, delete "psuedowires," and insert -- pseudowires, --, therefor.

In the claims

In Column 11, Line 30, in Claim 10, delete "supported by" and insert -- supported by the --, therefor.

Signed and Sealed this
Sixth Day of October, 2015

Michelle K. Lee
*Director of the United States Patent and Trademark Office*